(12) United States Patent
Huang et al.

(10) Patent No.: US 9,872,173 B2
(45) Date of Patent: Jan. 16, 2018

(54) COMMUNICATION METHOD OF HIDING PRIVACY INFORMATION AND SYSTEM THEREOF

(71) Applicants: Nen-Fu Huang, Hsinchu (TW); Wei-Kuan Shih, Hsinchu (TW); Yi-Ju Liao, Hsinchu (TW)

(72) Inventors: Nen-Fu Huang, Hsinchu (TW); Wei-Kuan Shih, Hsinchu (TW); Yi-Ju Liao, Hsinchu (TW)

( * ) Notice: Subject to any disclaimer, the term of this patent is extended or adjusted under 35 U.S.C. 154(b) by 76 days.

(21) Appl. No.: 14/926,289

(22) Filed: Oct. 29, 2015

(65) Prior Publication Data

US 2016/0127892 A1  May 5, 2016

(30) Foreign Application Priority Data

Oct. 31, 2014 (TW) .............................. 103137913 A

(51) Int. Cl.
| | |
|---|---|
| *H04L 29/06* | (2006.01) |
| *H04W 12/02* | (2009.01) |
| *H04M 15/00* | (2006.01) |
| *G06F 21/62* | (2013.01) |
| *H04L 29/08* | (2006.01) |
| *H04W 84/20* | (2009.01) |

(52) U.S. Cl.
CPC ........ *H04W 12/02* (2013.01); *G06F 21/6245* (2013.01); *H04L 63/0421* (2013.01); *H04L 67/141* (2013.01); *H04L 67/34* (2013.01); *H04M 15/56* (2013.01); *H04W 84/20* (2013.01)

(58) Field of Classification Search
CPC .. H04W 12/02; H04W 84/20; H04L 63/0421; H04L 67/34; H04L 67/141; H04M 15/56; G06F 21/6245
See application file for complete search history.

(56) References Cited

U.S. PATENT DOCUMENTS 8,166,296 B2 * 4/2012 Buer ..................... H04L 63/068
  713/168
8,289,890 B2 * 10/2012 Murayama .......... H04W 76/021
  358/1.15
8,856,359 B2 * 10/2014 Guedalia ........... H04L 29/06027
  709/220

(Continued)

*Primary Examiner* — David Garcia Cervetti
(74) *Attorney, Agent, or Firm* — Muncy, Geissler, Olds & Lowe, P.C.

(57) ABSTRACT

A communication method of hiding privacy information and a system thereof are provided. The method comprises following steps: performing an identification unit generating program to generate a master identification unit and a slave identification unit; storing a first identification code and a second identification code to a communication server; adding the first identification code into a first communication program of a first mobile device by detecting the master identification unit; adding the second identification code into a second communication program of a second mobile device by detecting the slave identification unit; executing the second communication program to transmit a communication request to the communication server; and the first identification code and the second identification code are utilized by the communication server to establish a communication link from the second communication program to the first communication program.

10 Claims, 5 Drawing Sheets

(56) References Cited

U.S. PATENT DOCUMENTS

| | | | | |
|---|---|---|---|---|
| 8,862,129 | B2 * | 10/2014 | Moshir | G06F 21/35 340/539.11 |
| 8,880,660 | B2 * | 11/2014 | Miyazawa | G06F 9/445 455/466 |
| 9,185,552 | B2 * | 11/2015 | Mao | H04L 63/0428 |
| 9,338,157 | B1 * | 5/2016 | Vazquez | H04L 63/0823 |
| 9,516,018 | B1 * | 12/2016 | Vazquez | H04L 63/0853 |
| 9,565,175 | B1 * | 2/2017 | Saylor | G06F 21/10 |
| 9,600,674 | B2 * | 3/2017 | Coffing | H04L 51/38 |
| 9,635,108 | B2 * | 4/2017 | Thomas | H04L 67/1095 |
| 2002/0138761 | A1 * | 9/2002 | Kanemaki | G06F 21/33 726/7 |
| 2002/0154759 | A1 * | 10/2002 | Ishii | G06Q 20/12 379/373.01 |
| 2004/0062400 | A1 * | 4/2004 | Sovio | H04L 9/0827 380/286 |
| 2004/0157590 | A1 * | 8/2004 | Lazaridis | H04L 29/12301 455/415 |
| 2006/0242404 | A1 * | 10/2006 | Su | G06Q 20/027 713/150 |
| 2007/0112964 | A1 * | 5/2007 | Guedalia | H04L 29/06027 709/227 |
| 2008/0095373 | A1 * | 4/2008 | Nagata | H04L 63/10 380/278 |
| 2008/0137859 | A1 * | 6/2008 | Jagadeesan | H04L 63/062 380/270 |
| 2008/0188207 | A1 * | 8/2008 | Lee | H04W 8/18 455/414.1 |
| 2009/0290713 | A1 * | 11/2009 | Belenky | G06F 21/10 380/277 |
| 2010/0138660 | A1 * | 6/2010 | Haynes | H04L 63/061 713/171 |
| 2010/0223463 | A1 * | 9/2010 | Sakaguchi | H04L 9/083 713/168 |
| 2011/0113340 | A1 * | 5/2011 | Miyazawa | G06F 9/445 715/736 |
| 2013/0252585 | A1 * | 9/2013 | Moshir | G06F 21/35 455/411 |
| 2013/0332725 | A1 * | 12/2013 | Inoue | H04W 12/04 713/155 |
| 2014/0045472 | A1 * | 2/2014 | Sharma | H04W 4/08 455/416 |
| 2014/0067983 | A1 * | 3/2014 | Gabriel | G06F 11/2005 709/208 |
| 2014/0095881 | A1 * | 4/2014 | Chan | G06F 17/30085 713/171 |
| 2014/0269646 | A1 * | 9/2014 | Ramasamy | H04W 76/023 370/338 |
| 2014/0273820 | A1 * | 9/2014 | Narayan | H04W 76/023 455/41.1 |
| 2014/0282923 | A1 * | 9/2014 | Narayan | G06F 21/44 726/5 |
| 2014/0342670 | A1 * | 11/2014 | Kang | H04W 4/008 455/41.2 |
| 2015/0087289 | A1 * | 3/2015 | Ahn | H04W 4/001 455/419 |
| 2015/0127835 | A1 * | 5/2015 | Zwaal | H04L 67/142 709/227 |
| 2015/0288779 | A1 * | 10/2015 | Okumura | H04L 67/10 709/219 |
| 2015/0294137 | A1 * | 10/2015 | Miyazaki | G06K 9/00751 382/190 |
| 2015/0296031 | A1 * | 10/2015 | Miyazaki | G06F 17/30861 709/204 |
| 2015/0341686 | A1 * | 11/2015 | Wen | H04N 21/25808 725/109 |
| 2015/0347577 | A1 * | 12/2015 | Miyazaki | H04N 21/436 707/752 |
| 2016/0014574 | A1 * | 1/2016 | Christmas | H04W 4/14 455/466 |
| 2016/0034990 | A1 * | 2/2016 | Kannair | G06Q 30/0609 705/51 |
| 2016/0100279 | A1 * | 4/2016 | Christmas | H04W 4/008 455/41.2 |
| 2016/0155112 | A1 * | 6/2016 | Phillips | G06K 19/06037 235/379 |
| 2016/0315923 | A1 * | 10/2016 | Riscombe-Burton | H04L 63/0281 |
| 2017/0026321 | A1 * | 1/2017 | Ciavatta | H04L 51/08 |
| 2017/0034149 | A1 * | 2/2017 | Kang | H04L 63/08 |
| 2017/0163523 | A1 * | 6/2017 | Christmas | H04L 45/24 |

* cited by examiner

COMMUNICATION METHOD OF HIDING PRIVACY INFORMATION AND SYSTEM THEREOF

CROSS-REFERENCE TO RELATED APPLICATION

This application claims priority from Taiwan Patent Application No. 103137913, filed on Oct. 31, 2014, in the Taiwan Intellectual Property Office, the content of which are hereby incorporated by reference in their entirety for all purposes.

BACKGROUND OF THE INVENTION

1. Field of the Invention

This application relates to a communication method and a system thereof, and more particularly, to a communication method of hiding privacy information and a system thereof to avoid the personal account number being misappropriated.

2. Description of the Related Art

VoIP (Voice over Internet Protocol) is a new type of telephony which is accomplished through the Internet or other networks using the IP technology. With the growing popularity of Internet, as well as an increasing number of the cross-border communications, the IP telephone has also been used in the long-distance telephone service. In addition, as the competitions among the major cities in the world are fierce, and the national laws and regulations related to telecommunications are deregulated, the IP telephone has been used in the field of the fixed network communication gradually. The fixed network communication has the major characteristics such as low operation cost, low construction cost, easy expandability and increasingly excellent communication quality, and thus, it is regarded as a strong contender for the traditional telecom services by the current international telecommunication companies.

Regarding the current prevailing free VoIP telephone software on the market, users only need to install this software to enjoy the free call. However, the VoIP telephone software has the technical problems as follows.

1. The account number may be stolen by someone with bad intentions.
2. The user is not able to delete or disable their private account number from the mobile device of the receiver.
3. The current VoIP telephone software is lacking in flexible mechanism, and fails to enable the user to conduct the communication set up according to the object of the receiver.

Therefore, the present disclosure provides a communication method and a system thereof to resolve the foregoing technical problems.

SUMMARY OF THE INVENTION

In view of the aforementioned problem, one objective of the present disclosure is to provide a communication method of hiding privacy information and a system thereof to avoid the existing account number being misappropriated by someone with bad intentions.

In view of the aforementioned problem, another objective of the present disclosure is to provide a communication method of hiding privacy information and a system thereof which are able to disable the private account number from the mobile device of the receiver.

In view of the aforementioned problem, yet another objective of the present disclosure is to provide a communication method of hiding privacy information and a system thereof which enable the user to conduct the communication set up according to the object of the receiver.

Accordingly, the present disclosure provides a communication method of hiding privacy information for communication between a first mobile device and a second mobile device. The communication method may include the following steps. An identifying unit generation program may be performed to generate a master identifying unit and a slave identifying unit, the master identifying unit may include a first identification code, and the slave identifying unit may include a second identification code. The first identification code and the second identification code may be stored in a communication establishment server. The master identifying unit may be detected by the first mobile device and the first identification code may be added to a first communication application program of the first mobile device. The slave identifying unit may be detected by the second mobile device and the second identification code may be added to a second communication application program of the second mobile device. The second communication application program may be performed to send a communication request to the communication establishment server, the communication request may include the second identification code. A communication link from the second communication application program to the first communication application program may be established by the communication establishment server according to the first identification code and the second identification code, wherein when the first mobile device detects the master identifying unit at the first time, the first mobile device may connect to a cloud server to download and install the first communication application program, the first mobile device may upload an identification code to the communication establishment server, and the communication establishment server may use the first identification code associated with the identification code to establish the communication link.

Preferably, a communication setting condition may be set up on the master identifying unit and the slave identifying unit by the identifying unit generation program, so as to establish the communication link by the first communication application program or the second communication application program according to the communication setting condition. The communication setting condition may include a limited call duration, a specific period of the communication, a manner to make a call, a name of a caller ID or a communication invalidation time.

Preferably, the plurality of master identifying units may be detected by the first mobile device, so as to increase the plurality of first identification codes with respect to the plurality of master identifying units by the first communication application program.

Preferably, a plurality of first shortcut icons may be generated on the screen of the first mobile device correspondingly according to the plurality of first identification codes, and the first communication application program may be performed by clicking on one of the plurality of first shortcut icons, so as to connect with the communication establishment server by the first communication application program, and to establish the communication link from the first communication application program to the second communication application program by the communication establishment server.

Preferably, the plurality of first identification codes may be allowed to appear in the first communication application program at the same time, so as to establish the communication link by the communication establishment server anytime according to the communication request of the plurality of second identification codes with respect to the plurality of first identification codes.

According to the aforementioned objective, the present disclosure further provides a communication system of hiding privacy information for communication between a first mobile device including a first communication application program and a second mobile device including a second communication application program. The communication system may include: a memory, a display interface and a communication processor. The memory may store a plurality of first identification codes and a plurality of second identification codes corresponding to the plurality of first identification codes respectively. The display interface may display a master identifying unit and a slave identifying unit. The master identifying unit and the slave identifying unit may include a first identification code of the plurality of first identification code and a second identification code of the plurality of second identification codes. The display interface may be applied to the first mobile device or the second mobile device for performing the detection, such that the first mobile device acquires the first identification code and adds the first identification code into the first communication application program, or the second mobile device acquires the second identification code and adds the second identification code into the second communication application program. The connection processor may receive a communication request including the first identification code or the second identification code, and may establish a communication link from the first communication application program to the second communication application program, or from the second communication application program to the first communication application program according to the second identification code or the first identification code. Wherein when the first mobile device detects the master identifying unit at the first time, the first mobile device may upload an identification code to the connection processor, and the connection processor may use the first identification code associated with the identification code to establish the communication link.

Preferably, the master identifying unit or the slave identifying unit may include a communication setting condition, the first communication application program or the second communication application program may establish the communication link according to the communication setting condition, and the communication setting condition may include a limited call duration, a specific period of the communication, a manner to make a call, a name of a caller ID or a communication invalidation time.

Preferably, after the first mobile device detects the at least one master identifying unit, the first communication application program may increase the at least one first identification code with respect to the at least one master identifying unit.

Preferably, the first mobile device may generate at least one first shortcut icon with respect to the at least one first identification code on a screen of the first mobile device, the first communication application program may be performed by clicking on one of the at least one first shortcut icon, to have a connection from the first communication application program to the connection processor, and to establish the communication link from the first communication application program to the second communication application program by the connection processor.

Preferably, the at least one first identification code may be allowed to appear in the first communication application program at the same time, such that the connection processor establishes the communication link anytime according to the communication request of the at least one second identification code with respect to the at least one first identification code.

BRIEF DESCRIPTION OF THE DRAWINGS

Hereinafter, embodiments of the present disclosure will be described in detail with reference to the accompanying drawings so that those skilled in the art to which the present disclosure pertains can realize the present disclosure, wherein.

DETAILED DESCRIPTION OF THE PREFERRED EMBODIMENTS

As used herein, the term "and/or" includes any and all combinations of one or more of the associated listed items. Expressions such as "at least one of," when preceding a list of elements, modify the entire list of elements and do not modify the individual elements of the list.

Figure 1:
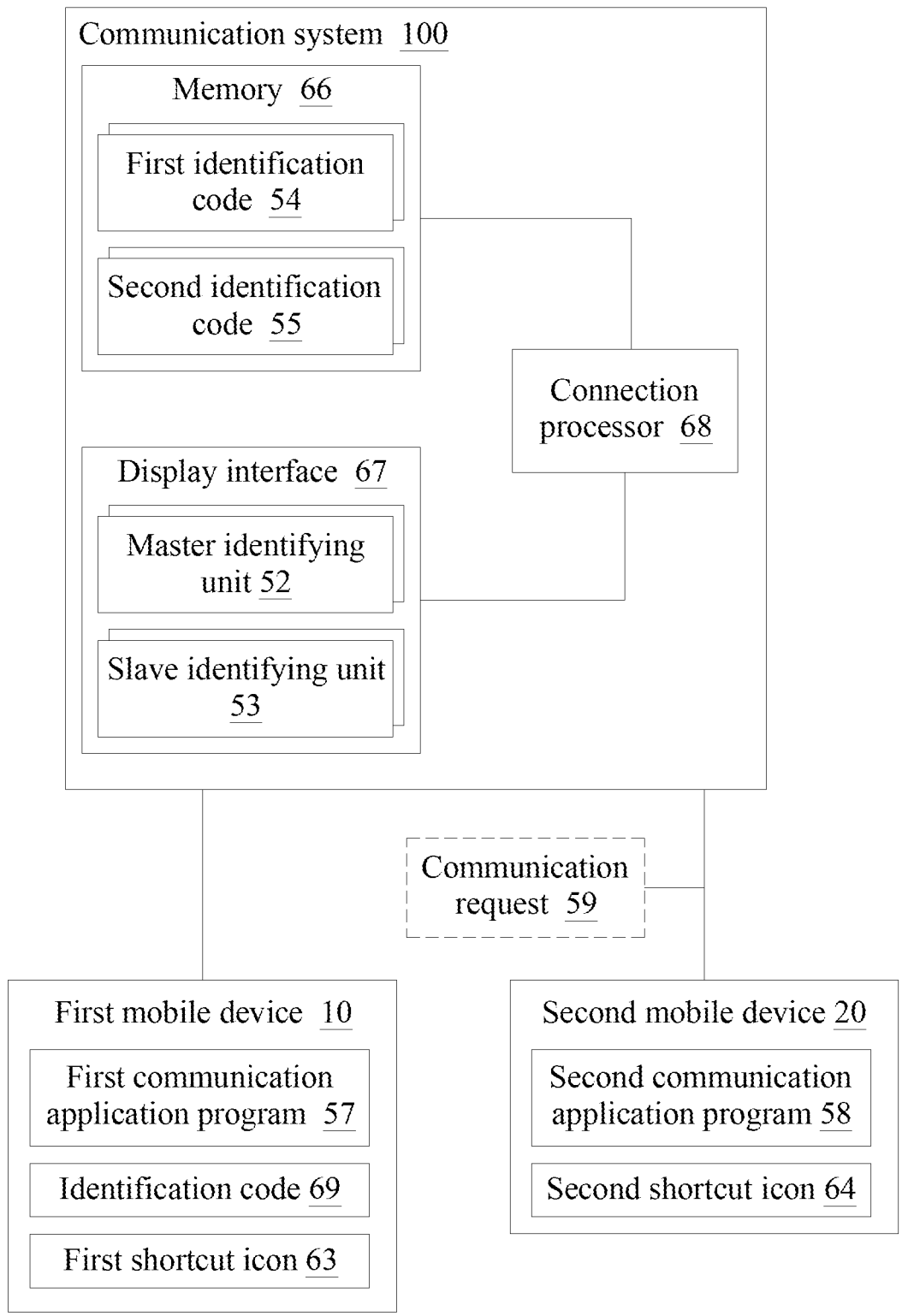
FIG. 1 is a block diagram of an embodiment of a communication system of hiding privacy information in accordance the present disclosure.

Please refer to FIG. 1 which is a block diagram of an embodiment of a communication system of hiding privacy information in accordance the present disclosure. As shown in the figure, a communication system of hiding privacy information 100 for communication between a first mobile device 10 including a first communication application program 57 and a second mobile device 20 including a second communication application program 58. The first mobile device 10 and the second mobile device 20 may be a smart connection device, such as a smart phone or a tablet, and the communication system of hiding privacy information 100 may be a workstation in the cloud server, a host, a real machine, or a server.

The communication system of hiding privacy information 100 includes a memory 66, a display interface 67 and a connection processor 68. The memory 66 stores a plurality of first identification codes 54 and a plurality of second identification codes 55 corresponding to the plurality of first identification codes 54. Wherein, the memory 66 may include different types of mass storage devices, such as a removable media device, a hard disk drive device (also referred to as a fixed disk device), or an optical drive device. The display interface 67 may be a software interface which is applied to display a master identifying unit 52 and a slave identifying unit 53. Wherein, the master identifying unit 52 and the slave identifying unit 53 may include a two-dimensional bar code, a word, or a QR-code. The connection processor 68 may include a central processor or a microcontroller.

To be more precise, the master identifying unit 52 and the slave identifying unit 53 include a first identification code 54 of the plurality of first identification codes 54 and a second identification code 55 of the plurality of second identification codes 55. The display interface 67 displays the master identifying unit 52 and the slave identifying unit 53 for being detected by the first mobile device 10 or the second mobile device 20, such that the first mobile device 10 acquires the first identification code 54 and adds the first identification code 54 into the first communication application program 57, or the second mobile device 20 acquires the second identification code 55 and adds the second identification code 55 into the second communication application program 58.

The connection processor 68 receives a communication request 59 from the first communication application program 57 or the second communication application program 58. When the communication request 59 is sent from the first communication application program 57, the communication request 59 also includes the first identification code 54, and when the communication request 59 is sent from the second communication application program 58, the communication request 59 also includes the second identification code 55. The connection processor 68 may establish the communication link 60 from the first communication application program 57 to the second communication application program 58 or from the second communication application program 58 to the first communication application program 57 according to the second identification code 55 or the first identification code 54.

Figure 2A:
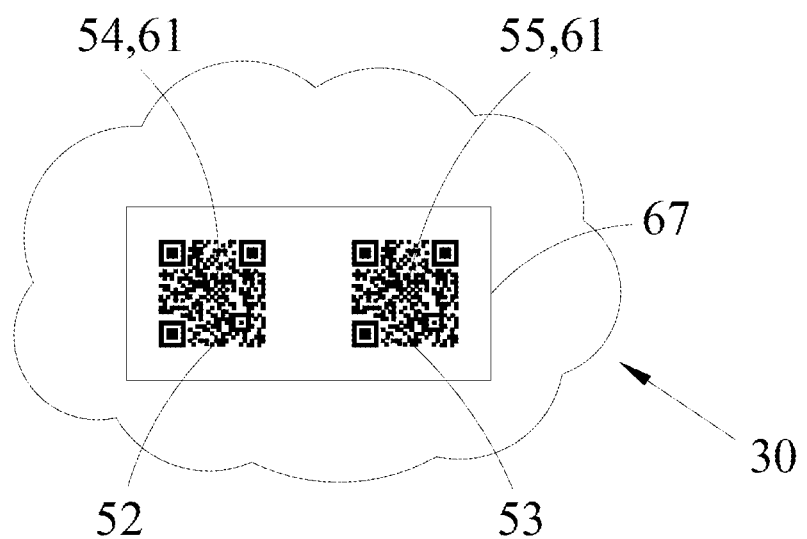
FIG. 2A is a first schematic diagram of an embodiment of a communication system of hiding privacy information in accordance the present disclosure.
Figure 2B:
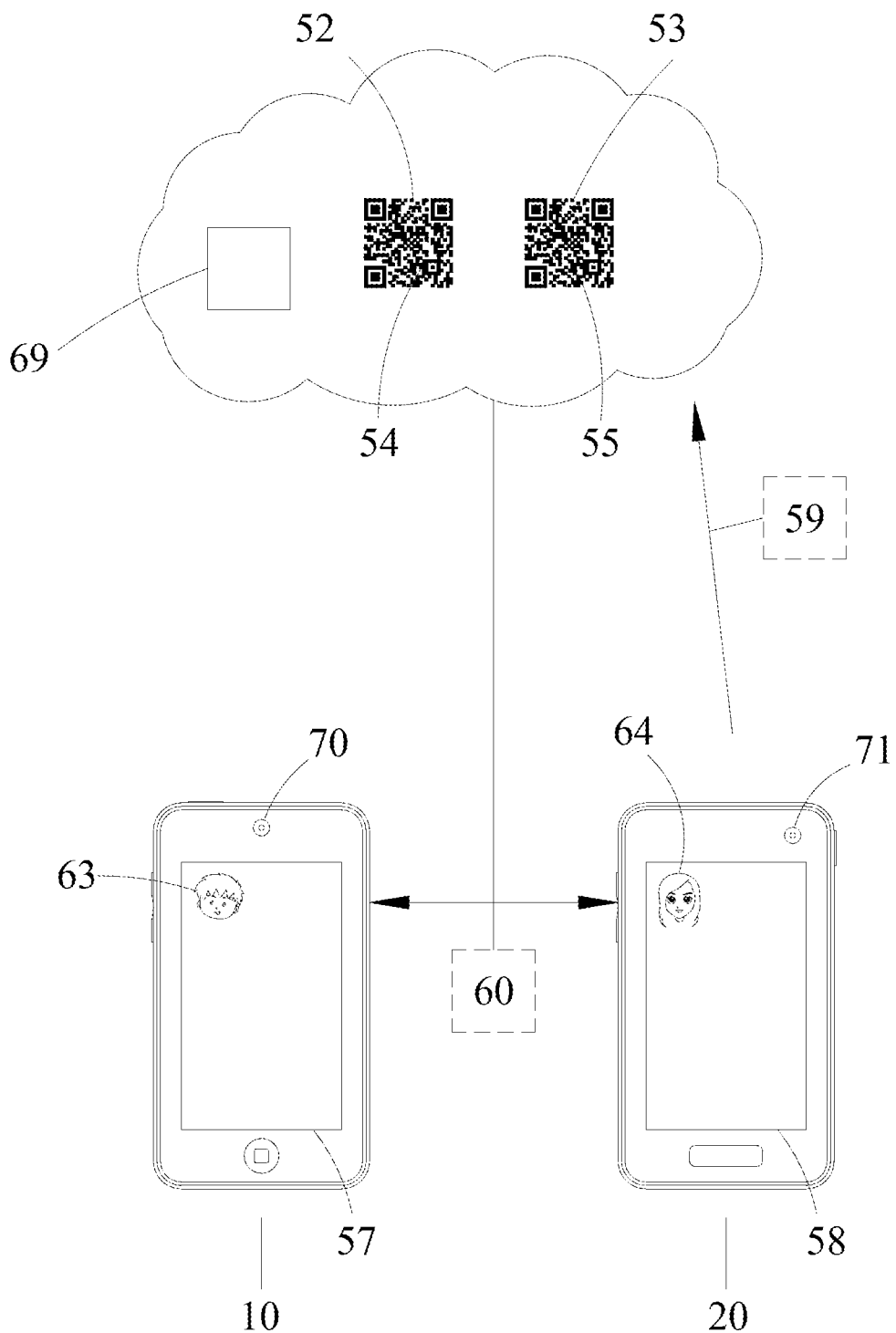
FIG. 2B is a second schematic diagram of an embodiment of a communication system of hiding privacy information in accordance the present disclosure.
Figure 2C:
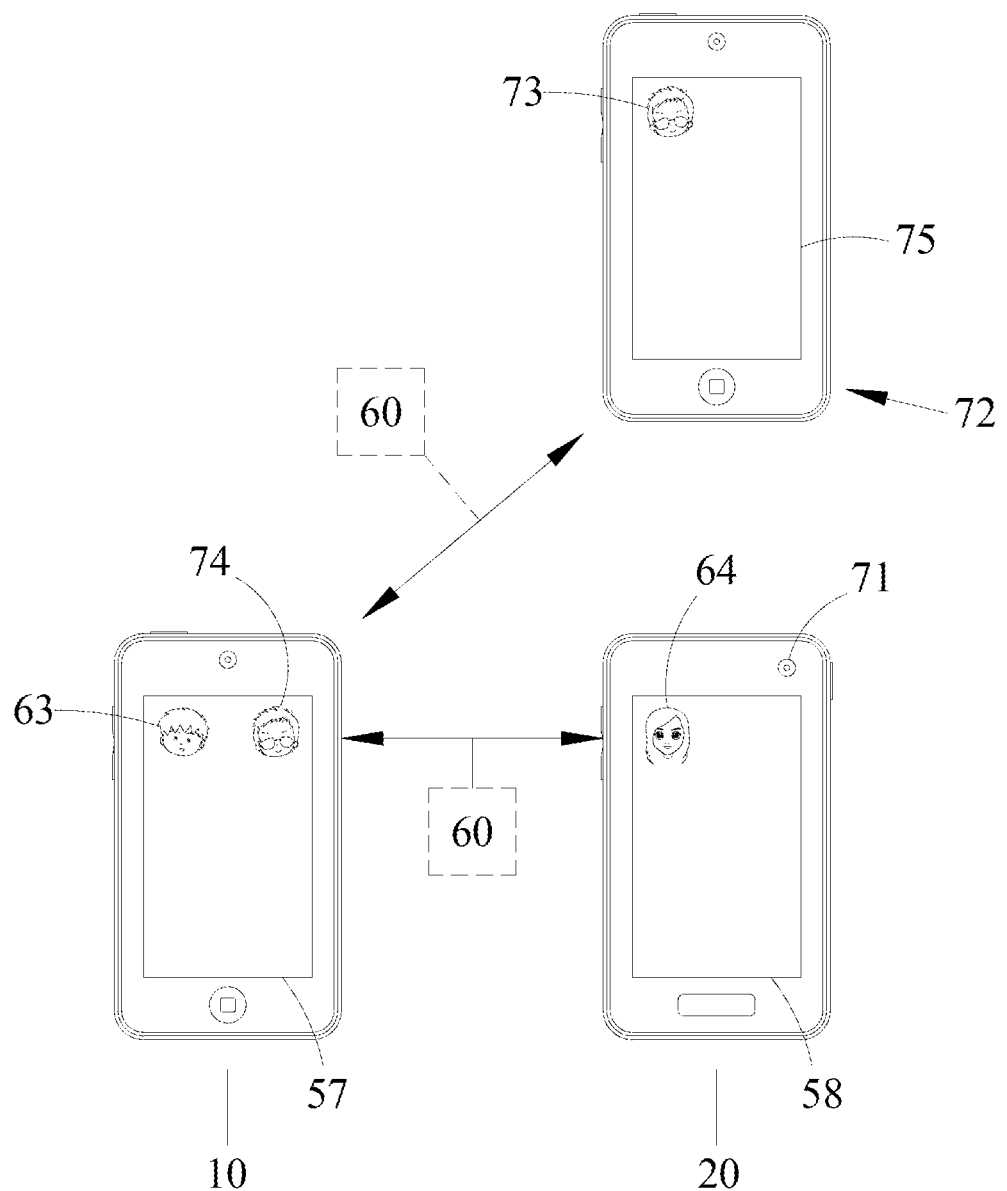
FIG. 2C is a third schematic diagram of an embodiment of a communication system of hiding privacy information in accordance the present disclosure.

Please refer to FIG. 2A, FIG. 2B and FIG. 2C together, which are a first schematic diagram of an embodiment of a communication system of hiding privacy information in accordance the present disclosure, a second schematic diagram of an embodiment of a communication system of hiding privacy information in accordance the present disclosure, and a third schematic diagram of an embodiment of a communication system of hiding privacy information in accordance the present disclosure, respectively. As shown in FIG. 2A, the communication system of hiding privacy information 100 is a communication establishment server 30, and the communication establishment server 30 is applied to store the master identifying unit 52 and the slave identifying unit 53. The master identifying unit 52 and the slave identifying unit 53 are produced by an identifying unit generation program, wherein the identifying unit generation program is applied to establish the master identifying unit 52 and slave identifying unit 53 in pairs, and a communication setting condition 61 is established in the master identifying unit 52 or the slave identifying unit 53. The communication setting condition 61 includes a limited call duration, a specific period of the communication, a manner to make a call, a name of a caller ID or a communication invalidation time. The master identifying unit 52 and the slave identifying unit 53 of the present embodiment apply the QR-code as an example, but it shall be not limited thereto.

In practice, the master identifying unit 52 and the slave identifying unit 53 are shown on the display interface 67 in pairs, and the first identification code 54 and the second identification code 55 are respectively included in the master identifying unit 52 and the slave identifying unit 53. The display interface 67 may be a software interface and transmitted to appear on a computer screen through the network.

As shown in FIG. 2B, the first mobile device 10 and the second mobile device 20 may apply a first image capturing unit 70 and a second image capturing unit 71 to respectively detect the master identifying unit 52 and the slave identifying unit 53 appeared on the display interface 67, such that the first identification code 54 is added to the first communication application program 57 of the first mobile device 10 and the second identification code 54 is added to the second communication application program 58 of the second mobile device 20. The first image capturing unit 70 and the second image capturing unit 71 may be the camera or the scanner. When the detection is completed successfully, a first short cut icon 63 is shown on the screen of the first mobile device 10, and a second shortcut icon 64 is shown on the screen of the second mobile device 20. The user may click on the first short cut icon 63 to perform the first communication application program 57, or click on the second shortcut icon 64 to perform the second communication application program 58.

To be more precise, while the second identification code 55 is added to the second communication application program 58 and the second shortcut icon 64 is generated, the communication setting condition 61 is set in the second communication application program 58 at the same time. When the user performs the second communication application program 58 through the second shortcut icon 64, the second communication application program 58 applies the contents set in the communication setting condition 61.

In practice, the first communication application program 57 and the second communication application program 58 may be arranged on the first mobile device 10 and the second mobile device 20 in advance. Alternatively, when the first mobile device 10 detects the master identifying unit 52 at the first time, the first mobile device 10 automatically downloads and then installs the first communication application program 57. What has to be addressed is that an identification code 69 has to be uploaded to the communication establishment server 30 by the first mobile device 10, such that the communication establishment server 30 is able to apply the identification code 69 associated with the first identification code 54 to establish the first mobile device to connect to the communication link 60 of the other mobile devices.

When clicking on the second shortcut icon 64, the second communication application program 58 sends a communication request 59 including the second identification code 55 to the communication establishment server 30 instantly, such that the communication establishment server 30 searches the first mobile device 10 according to the first identification code 54 and the identification code 69 corresponding to the first mobile device 10, and establishes the communication link 60 from the second communication application program 58 to the first communication application program 57.

As shown in FIG. 2C, when the first mobile device 10 detects another master identifying unit again, a fourth shortcut icon 74 is added and appeared on the screen of the first mobile device 10. A third mobile device 72 detects a slave identifying unit corresponding to the master identifying unit and generates the third shortcut icon 73 to be appeared on the screen of the third mobile device 72. By clicking on the third shortcut icon 73, the communication link 60 from a third communication application program 75 to the first communication application program 57 is established. The establishment method has been described in FIG. 2B, and the unnecessary details are thus no longer given herein.

It is worth mentioning that when the fourth shortcut icon 74 is added, another identification code corresponding to the first communication application program 57 is added, and the communication setup between the third communication application program 75 and the first communication application program 57 is different from the communication setup between the second communication application program 58 and the first communication application program 57. For example, the communication time between the third communication application program 75 and the first communication application program 57 is valid at 18:00-22:00 on every weekday, and the communication time between the second communication application program 58 and the first communication application program 57 is valid at 09:00-18:00 in daytime. When a call is dialed beyond the validation communication time, it fails to perform a communication by the communication system. Such flexible communication system enables the user to choose the communication mode and time between the caller and the receiver.

The user is able to apply for a plurality of personal account numbers in a communication system in terms of the prior art. However, only one account number can perform a communication within a communication time, and the user has to log out the other using account numbers. Consequently, someone with bad intentions may be able to figure out whether these account numbers belong to the same user through the appropriate tests. What is the difference between the prior art and the present disclosure is that the first communication application program 57 of the communication system 100 enables a plurality of identification codes being stored simultaneously, and is able to establish the communication link 60 with the other communication application programs without switching the identification code or logging out the personal identification. As a result, compared with the prior art, the communication system of hiding privacy information of the present disclosure is indeed capable of hiding privacy information so as to avoid the privacy leakage.

Figure 3:
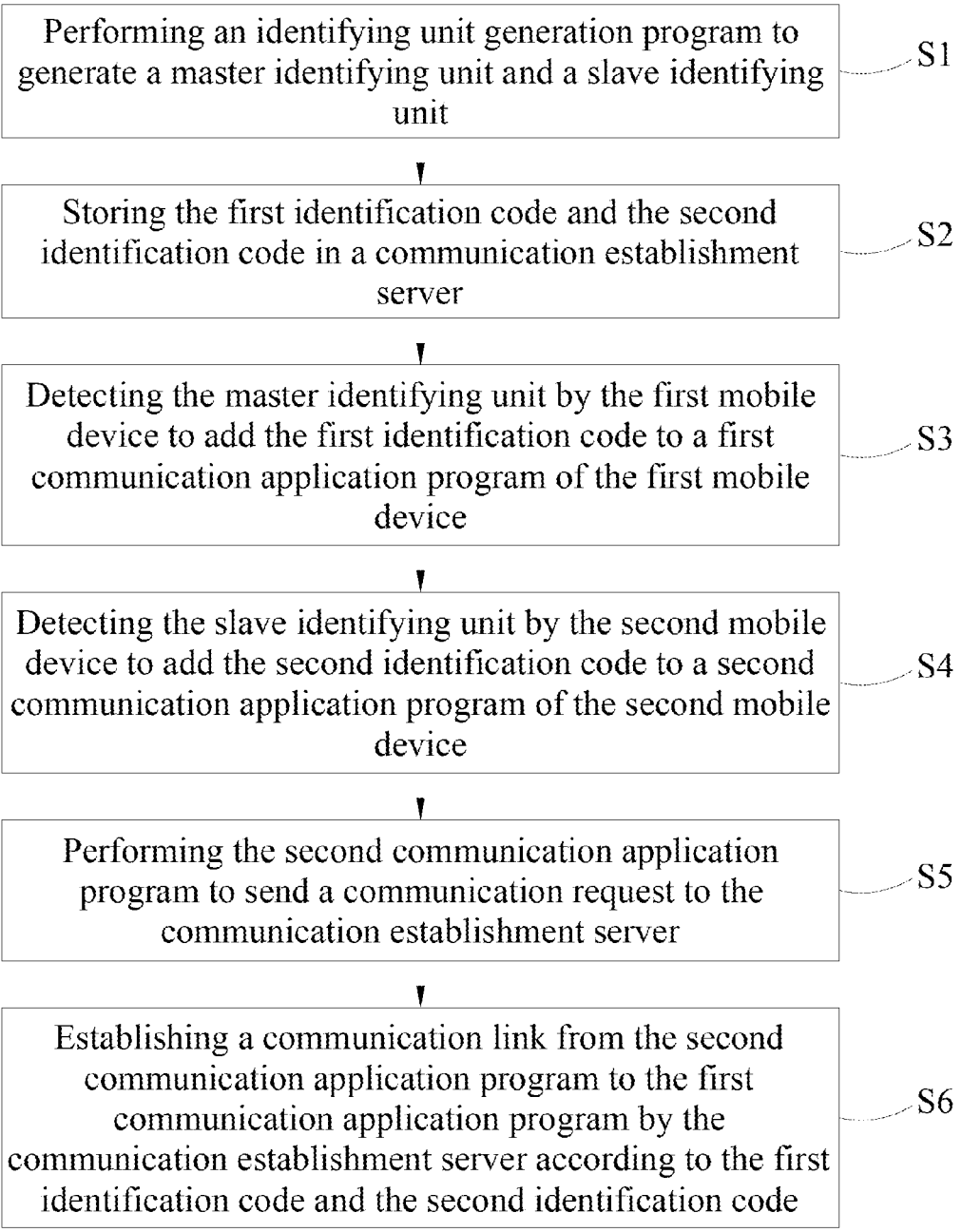
FIG. 3 is a flow chart of an embodiment of a communication method of hiding privacy information in accordance the present disclosure.

FIG. 3 is a flow chart of an embodiment of a communication method of hiding privacy information in accordance the present disclosure.

Step S1 is performing an identifying unit generation program to generate a master identifying unit and a slave identifying unit, the master identifying unit includes a first identification code, and the slave identifying unit includes a second identification code.

Step S2 is storing the first identification code and the second identification code in a communication establishment server.

Step S3 is detecting the master identifying unit by the first mobile device to add the first identification code to a first communication application program of the first mobile device.

Step S4 is detecting the slave identifying unit by the second mobile device to add the second identification code to a second communication application program of the second mobile device.

Step S5 is performing the second communication application program to send a communication request to the communication establishment server, the communication request includes the second identification code.

Step S6 is establishing a communication link from the second communication application program to the first communication application program by the communication establishment server according to the first identification code and the second identification code.

Wherein when the first mobile device detects the master identifying unit at the first time, the first mobile device connects to a cloud server to download and install the first communication application program, the first mobile device uploads an identification code to the communication establishment server, and the communication establishment server uses the first identification code associated with the identification code to establish the communication link.

In conclusion, a communication method of hiding privacy information and a system thereof of the present disclosure enable the user to use the internet phone without an account number, so as to prevent the privacy information being misappropriated by someone with bad intentions. In addition, a communication system of the present disclosure allows a plurality of personal identifications being stored in the communication application program simultaneously and a communication setup is able to be made according to the communication links of various identification codes, such that the user can use the communication link more flexibly. Moreover, the user can use various identification codes to establish a communication link with the others, such that the privacy leakage can be avoided more effectively.

While the means of specific embodiments in present disclosure has been described by reference drawings, numerous modifications and variations could be made thereto by those skilled in the art without departing from the scope and spirit of the invention set forth in the claims. The modifications and variations should in a range limited by the specification of the present disclosure.

What is claimed is:

1. A communication method of hiding privacy information for communication between a first mobile device and a second mobile device, the communication method comprising:

performing an identifying unit generation program by a communication establishment server to generate a master identifying unit and a slave identifying unit, the master identifying unit comprising a first identification code, and the slave identifying unit comprising a second identification code;

storing the first identification code and the second identification code in the communication establishment server;

detecting the master identifying unit by the first mobile device to add the first identification code to a first communication application program of the first mobile device;

detecting the slave identifying unit by the second mobile device to add the second identification code to a second communication application program of the second mobile device;

performing the second communication application program to send a communication request to the communication establishment server, the communication request comprising the second identification code; and establishing a communication link from the second communication application program to the first communication application program by the communication establishment server according to the first identification code and the second identification code;

wherein when the first mobile device detects the master identifying unit at the first time, the first mobile device connects to a cloud server to download and install the first communication application program, the first mobile device uploads an identification code to the communication establishment server, and the communication establishment server uses the first identification code associated with the identification code to establish the communication link.

2. The communication method of claim 1, further comprising setting up a communication setting condition on the master identifying unit and the slave identifying unit by the identifying unit generation program, wherein the communication link is established by the first communication application program or the second communication application program according to the communication setting condition, wherein the communication setting condition comprises a limited call duration, a specific period of the communication, a manner to make a call, a name of a caller ID or a communication invalidation time.

3. The communication method of claim 1, further comprising detecting a plurality of master identifying units by the first mobile device, and increasing a plurality of first identification codes with respect to the plurality of master identifying units by the first communication application program.

4. The communication method of claim 3, further comprising generating a plurality of first shortcut icons on the screen of the first mobile device correspondingly according to the plurality of first identification codes, performing the first communication application program by clicking on one of the plurality of first shortcut icons, wherein the first mobile device is connected to the communication establishment server by the first communication application program, and the communication link from the first communication application program to the second communication application program is established by the communication establishment server.

5. The communication method of claim 4, further comprising allowing the plurality of first identification codes to appear in the first communication application program at the same time, wherein the communication link is established by the communication establishment server anytime according to the communication request of a plurality of second identification codes with respect to the plurality of first identification codes.

6. A communication system of hiding privacy information for communication between a first mobile device comprising a first communication application program and a second mobile device comprising a second communication application program, the communication system comprising:

a memory storing a plurality of first identification codes and a plurality of second identification codes corresponding to the plurality of first identification codes;

a display interface displaying a master identifying unit and a slave identifying unit, the master identifying unit and the slave identifying unit comprising a first identification code of the plurality of first identification codes and a second identification code of the plurality of second identification codes, wherein the display interface is applied to the first mobile device or the second mobile device for performing a detection, and the first mobile device acquires the first identification code and adds the first identification code into the first communication application program, or the second mobile device acquires the second identification code and adds the second identification code into the second communication application program; and a connection processor receiving a communication request comprising the first identification code or the second identification code, and establishing a communication link from the first communication application program to the second communication application program or from the second communication application program to the first communication application program according to the second identification code or the first identification code;

wherein when the first mobile device detects the master identifying unit at the first time, the first mobile device uploads an identification code to the connection processor, and the connection processor uses the first identification code associated with the identification code to establish the communication link.

7. The communication system of claim 6, wherein the master identifying unit or the slave identifying unit comprises a communication setting condition, the first communication application program or the second communication application program establishes the communication link according to the communication setting condition, and the communication setting condition comprises a limited call duration, a specific period of the communication, a manner to make a call, a name of a caller ID or a communication invalidation time.

8. The communication system of claim 6, wherein after the first mobile device detects at least one master identifying unit, the first communication application program increases at least one first identification code with respect to the at least one master identifying unit.

9. The communication system of claim 8, wherein the first mobile device generates at least one first shortcut icon with respect to the at least one first identification code on a screen of the first mobile device, the first communication application program is performed by clicking on one of the at least one first shortcut icon, wherein the first communication application program is connected to the connection processor, and the communication link from the first communication application program to the second communication application program is established by the connection processor.

10. The communication system of claim 9, wherein the at least one first identification code is allowed to appear in the first communication application program at the same time, wherein the connection processor establishes the communication link anytime according to the communication request of at least one second identification code with respect to the at least one first identification code.

* * * * *